W. WENOM.
NON-SKIDDER.
APPLICATION FILED APR. 30, 1913.
1,083,644.
Patented Jan. 6, 1914.
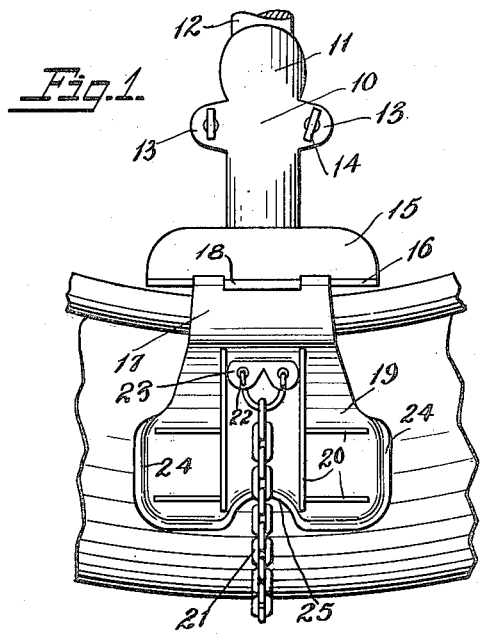
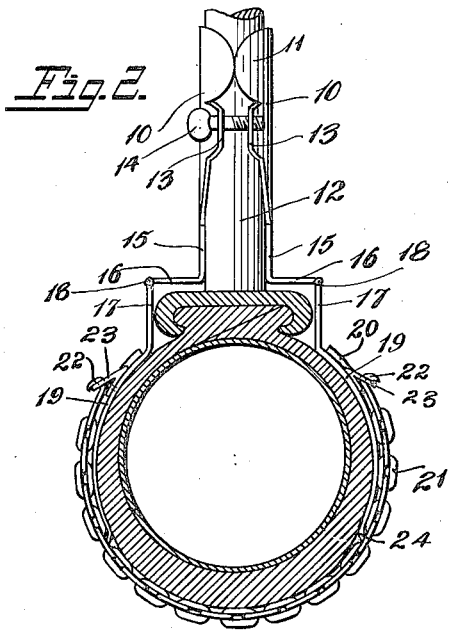
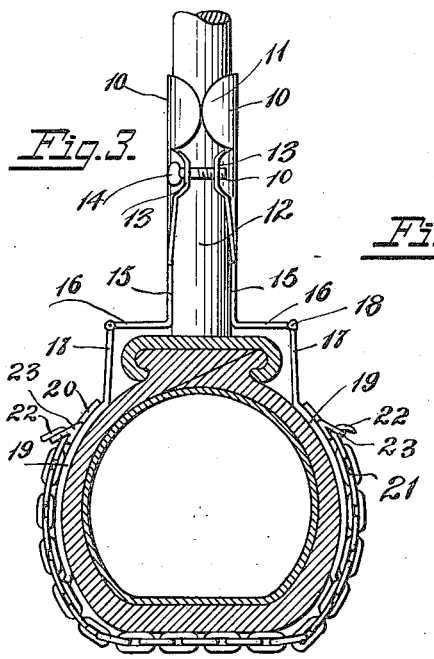
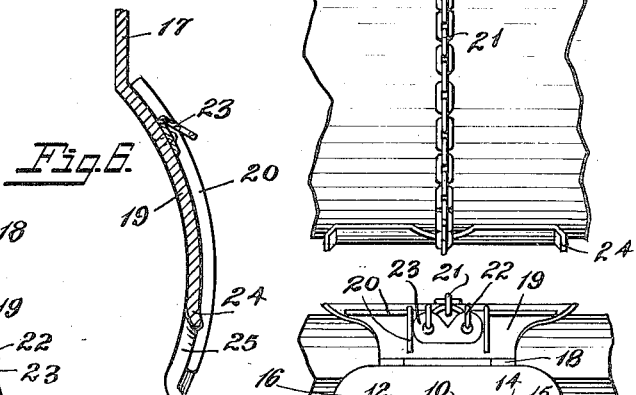
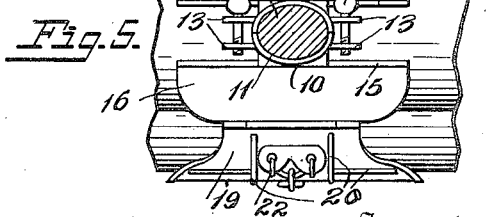
Witnesses
Marshall Low
S. P. Buck
Inventor
Wm. Wenom
By Chandlee & Chandlee
Attorneys

UNITED STATES PATENT OFFICE.

WILLIAM WENOM, OF KIRKWOOD, MISSOURI.

NON-SKIDDER.

1,083,644.

Specification of Letters Patent.

Patented Jan. 6, 1914.

Application filed April 30, 1913. Serial No. 764,643.

*To all whom it may concern:*

Be it known that I, WILLIAM WENOM, a citizen of the United States, residing at Kirkwood, in the county of St. Louis, State of Missouri, have invented certain new and useful Improvements in Non-Skidders; and I do hereby declare the following to be a full, clear, and exact description of the invention, such as will enable others skilled in the art to which it appertains to make and use the same.

This invention relates to non-skidding devices, and an object of the invention is to provide an improved combination chain and plate mechanism adapted to be applied to automobile wheels and tires for preventing the latter from skidding laterally or otherwise.

Another object of the invention is to provide a device of this character whereby the tires are protected from the detrimental action of the chains thereon.

Another object is to provide a device of this character which may be quickly and easily applied to each spoke of the automobile wheels.

Another object is to provide a device of this character which is simple of construction, comparatively inexpensive, light durable, and thoroughly efficient.

Other objects and advantages may be recited hereinafter and in the claims.

In the accompanying drawings, which supplement this specification: Figure 1 is a side elevation view of a fragment of a wheel having my improved non-skidder applied. Fig. 2 is a sectional view through the wheel-rim and tire adjacent to my improved non-skidder, the latter being illustrated in elevation. Fig. 3 is a view similar to Fig. 2, the tire being depressed, so that the non-skidder plates are spread laterally. Fig. 4 is a bottom view of a section of a tire having my improved non-skidder mounted thereon. Fig. 5 is a sectional view through one of the wheel spokes, illustrating the non-skidder in top plan, and Fig. 6 is an enlarged fragmental sectional view, the section being taken vertically through one of the lower plates.

Referring to these drawings, in which similar reference characters correspond with similar parts throughout the several views, each non-skidder device consists of a pair of clamp members or brackets 10 having their upper portions 11 concavo-convexed and adapted to fit snugly against the opposite sides of a wheel spoke 12. These members 10 are also provided with oppositely extending apertured ears 13, through the apertures of which extend clamping screws 14, which are threaded into one of the members 10 and are loosely fitted through the apertured ears of the other member 10, so that by turning these thumb-screws in the proper direction, they coact with the clamping jaws for constituting a clamp whereby the brackets may be quickly and securely clamped onto the spokes 12. The lower end of each clamp member or plate 10 is formed with lateral extensions 15, and extending substantially horizontally from these extensions, and forming the lower element of each plate 10, is a flange 16. To the outer edge of each flange 16 is hinged a guard plate 17 which depends from the hinge pivot 18, and the upper end of each plate 17 is substantially plane and vertical, while the major lower portion 19 which extends below said vertical portion, is evenly curved on one side and provided with strengthening ribs 20. The smooth concaved surfaces of the plates 19 fit snugly against the opposite sides of the tire, while the strengthening ribs 20 are formed on the convexed surface of the plates 19 and are spaced apart sufficiently to provide a seat for the chain 21. This chain has one end fixedly secured to one of the plates 19, while its other end is provided with a hook 22 which is adapted to engage with the apertured ear or keeper 23, so as to hold the chain within the channel between said strengthening ribs 20.

The plates 19 are each provided with diagonally disposed flanges 24 which extend down the opposite ends and are curved inward toward the lower middle recess 25. From an inspection of Figs. 4 and 6, it will be seen that in case the tire should tend to skid laterally, these flanges would engage with the ground or ice and overcome such tendency. Moreover, the vertical portions of the flanges 24 being turned away from the contiguous sides of the tire, very effectually avoid detrimental effect of the contact of the plates against the tire, being smooth and curved outward from said path.

The flanges 16 and vertical upper portions of the plates 19 are spaced apart from the rim of the wheel, so that the paint and varnish are not marred by use of the non-skidding device, and moreover, this spaced relation allows said flange and vertical portion to have a certain amount of play and spring action, so that when a stone or other protruding object is struck by the antiskidding device, these elements yield to the motion imparted thereto through the tire, and after the tire has returned to its normal shape, the spring action of said flange and vertical portion restores them to their normal shape.

From the foregoing, it will be seen that I contemplate employing relatively thin and springy material in the flanges 16 and the vertical elements connected therewith, and moreover, the entire mechanism is preferably made of steel, so that the different parts may not only have the resilient or springy qualities, but may be sufficiently tough, strong, and hard to resist breakage and minimize wear.

In practice, I may employ one of these non-skidding devices with each wheel-spoke, or I may otherwise distribute them at suitable intervals around the wheel.

It will be seen that I have provided a non-skidding device of this character which is fully capable of attaining the foregoing objects, in a thoroughly practical and efficient manner.

I do not limit my invention to the exact details of construction, combination and arrangement of parts, as herewith illustrated and described, but my invention may only be limited by a reasonable interpretation of the claims.

I claim:—

1. An antiskidding device consisting of a pair of clamping members adapted to be secured together on opposite sides of a wheel-spoke and being provided with oppositely extending horizontal flanges, a pair of oppositely disposed concavo-convexed members having their concaved sides adapted to be fitted against opposite sides of a wheel-tire and each having its outer surface provided with a channel and having its upper end hinged to one of said horizontally extending flanges, a chain having one end secured to one of said concavo-convexed members and having its other end movably engaged with the other concavo-convexed member and adapted to lie within the grooves of said concavo-convexed members and to extend across the tread of the tire.

2. An anti-skidding device including a pair of clamp members adapted to fit snugly against opposite sides of a wheel spoke, clamping means connecting said members, each member being provided with a laterally disposed flange, a guard plate hinged to the outer edge of each flange and curved on one side to fit against one side of a tire, ribs on said curved side forming a chain seat, and a chain in the seats of both plates adapted to extend across a tire tread, and means for securing the chains at the ends to said plates.

3. A non-skidding device provided with means for securing it to a wheel and comprising concaved plates fitted against the opposite sides of the tire and connected by a chain which extends across the tread of the tire, ribs formed on the plates at opposite sides of the chain and forming a seat for the latter, and diagonal flanges formed on the edges of the plates adjacent to the tread of the tire, substantially as shown and specified.

In testimony whereof, I affix my signature, in the presence of two witnesses.

WILLIAM WENOM.

Witnesses:
 FRED W. KERTH,
 F. W. SCHNEIDER.